US012519398B2

(12) United States Patent
Duan et al.

(10) Patent No.: US 12,519,398 B2
(45) Date of Patent: Jan. 6, 2026

(54) DUAL-ACTIVE BRIDGE CONVERTER AND CONTROL METHOD THEREFOR

(71) Applicant: SANTAK ELECTRONIC (SHENZHEN) CO., LTD., Shenzhen (CN)

(72) Inventors: Jiajie Duan, Shanghai (CN); Jianxiong Yu, Shanghai (CN); Qiang Chen, Shanghai (CN); Cheng Luo, Shanghai (CN)

(73) Assignee: SANTAK ELECTRONIC (SHENZHEN) CO., LTD., Shenzhen (CN)

( * ) Notice: Subject to any disclaimer, the term of this patent is extended or adjusted under 35 U.S.C. 154(b) by 243 days.

(21) Appl. No.: 18/490,436

(22) Filed: Oct. 19, 2023

(65) Prior Publication Data

US 2024/0146202 A1    May 2, 2024

(30) Foreign Application Priority Data

Oct. 31, 2022   (CN) .......................... 202211346914.4

(51) Int. Cl.
*H02M 3/335*   (2006.01)
*H02M 1/00*   (2006.01)

(52) U.S. Cl.
CPC ..... *H02M 3/33573* (2021.05); *H02M 1/0058* (2021.05)

(58) Field of Classification Search
CPC ........... H02M 3/33573; H02M 1/0058; H02M 3/33584; H02M 7/53871; H02M 1/0048; H02M 1/088; H02M 1/12; H02M 7/219; H02M 7/5395
See application file for complete search history.

(56) References Cited

U.S. PATENT DOCUMENTS

| 2016/0268917 A1* | 9/2016 | Ramsay | ............ H02M 7/53871 |
| 2017/0324345 A1* | 11/2017 | Stuler | ...................... H02M 1/08 |
| 2019/0199194 A1* | 6/2019 | Nikitin | .............. H02M 7/53873 |

FOREIGN PATENT DOCUMENTS

CN         113411003 A        9/2023

* cited by examiner

*Primary Examiner* — Kyle J Moody
(74) *Attorney, Agent, or Firm* — Stanek Lemon Crouse & Meeks, PA

(57) ABSTRACT

Disclosed herein is a dual-active bridge converter and methods of operating the same. The dual-active bridge converter can include a transformer, a DC-AC converter, an AC-DC converter, and/or a control device. The DC-AC converter can be coupled to a first DC bus and a primary side of the transformer. The AC-DC converter can be coupled to a secondary side of the transformer and a second DC bus. The control device can send a first PWM signal to the DC-AC converter and a second PWM signal to the AC-DC converter. The first and second PWM signals can initiate the output voltage at zero, add jump edges at odd-numbered current harmonics, or make a phase of the input voltage trail a phase of the output voltage of the DC-AC converter. The control device can adjust the PWM signals for transformer current regulation or pulse overlap control.

20 Claims, 18 Drawing Sheets

DUAL-ACTIVE BRIDGE CONVERTER AND CONTROL METHOD THEREFOR

RELATED APPLICATIONS

This application claims priority to China Application Number 202211346914.4, filed Oct. 31, 2022, entitled "Dual-Active Bridge Converter and Control Method Therefor," which is hereby incorporated by reference in its entirety.

TECHNICAL FIELD

The present inventive concepts generally relate to converters, and more specifically to dual-active bridge converters and associated control methods.

BACKGROUND

A dual-active bridge (DAB) converter can include a DC-AC converter, an AC-DC converter, and a transformer. A primary side of the transformer can be connected to an output end of the DC-AC converter, and a secondary side thereof can be connected to an input end of the AC-DC converter. The DC-AC converter can be provided with a pulse width modulation (PWM) signal at a kilohertz level (e.g., 10 to 100 kHz), and the transformer can operate at a frequency at a kilohertz level, so that the transformer may be a relatively small and lightweight high-frequency transformer or switched mode power supply transformer, thereby achieving higher power density and efficiency and reduced weight in ultra-large-scale power supply applications.

SUMMARY

Disclosed herein is a dual-active bridge converter. The dual-active bridge converter can include a DC-AC converter, an input end thereof being connected to a first direct current (DC) bus; an AC-DC converter, an output end thereof being connected to a second direct current bus; a transformer, a primary side thereof being connected to an output end of the DC-AC converter, and a secondary side thereof being connected to an input end of the AC-DC converter; and a control device. The control device can be configured to: provide a first pulse width modulation (PWM) signal to the DC-AC converter so as to cause an output voltage thereof to be zero at a starting time of each period of the first pulse width modulation signal and to have jump edges at particular times corresponding to particular odd-numbered current harmonics in the transformer, and provide a second pulse width modulation signal to the AC-DC converter so as to cause the phase of an input voltage thereof to lag behind the phase of the output voltage of the DC-AC converter. The control device can be further configured to adjust the first pulse width modulation signal and/or the second pulse width modulation signal so as to cause a current valley value of a positive half period of a current waveform of the transformer to be a negative value and a current valley value of a negative half period thereof to be a positive value.

In some cases, a switching procedure in the dual-active bridge converter can be a soft switching procedure, thereby reducing, or even eliminating, switching loss.

In some cases, the size of the negative value or the positive value is 1% to 10% of the amplitude of the current waveform.

In some cases, the control device controls the DC-AC converter to cause a voltage waveform of the output voltage thereof to be axisymmetric from the starting time to a half period of each period of the first pulse width modulation signal and to be centrosymmetric in each period of the pulse width modulation signal.

In some cases, the input voltage of the AC-DC converter and the output voltage of the DC-AC converter are a plurality of rectangular pulses or a plurality of step pulses.

In some cases, the jump edge is a rising edge or/and a falling edge.

In some cases, the control device controls the AC-DC converter to cause the input voltage thereof and the output voltage of the DC-AC converter to have the same voltage waveform.

In some cases, if the first pulse within each half period of the output voltage of the DC-AC converter does not overlap with any pulses of the input voltage of the AC-DC converter, the control device can be configured to: adjust the first pulse width modulation signal so as to add a first negative pulse before the first pulse of a positive half period of the output voltage of the DC-AC converter and to add a first positive pulse before the first pulse of a negative half period thereof and/or adjust the second pulse width modulation signal so as to add a second positive pulse before the first pulse of a positive half period of the input voltage of the AC-DC converter and to add a second negative pulse before the first pulse of a negative half period thereof. The pulse widths of the first positive pulse, the second positive pulse, the first negative pulse, and the second negative pulse can be less than the distance from the first pulse of the positive half period of the output voltage of the DC-AC converter to a zero point.

In some cases, if the first pulse within each half period of the output voltage of the DC-AC converter overlaps with a pulse of the input voltage of the AC-DC converter, the control device is configured to: adjust the first pulse width modulation signal so as to reduce the width of the first pulse of a positive half period of the output voltage of the DC-AC converter and the width of the first pulse of a negative half period thereof and/or adjust the second pulse width modulation signal so as to increase the width of the first pulse of a positive half period of the input voltage of the AC-DC converter and the width of the first pulse of a negative half period thereof.

In some cases, if the first pulse within each half period of the output voltage of the DC-AC converter overlaps with a pulse of the input voltage of the AC-DC converter, the control device is configured to: adjust the first pulse width modulation signal and the second pulse width modulation signal so as to cut off an overlapping portion between the first pulse within each half period of the output voltage of the DC-AC converter and the last pulse of a preceding half period of the input voltage of the AC-DC converter, and adjust the first pulse width modulation signal so as to add a first negative pulse before the first pulse of a positive half period of the output voltage of the DC-AC converter and to add a first positive pulse before the first pulse of a negative half period thereof and/or adjust the second pulse width modulation signal so as to add a second positive pulse before the first pulse of a positive half period of the input voltage of the AC-DC converter and to add a second negative pulse before the first pulse of a negative half period thereof. Pulse widths of the first positive pulse, the second positive pulse, the first negative pulse, and the second negative pulse can be less than the distance from the first pulse of the positive half period of the output voltage of the DC-AC converter to a zero point after the overlapping portion is cut off.

The present inventive concept provides a control method for a dual-active bridge converter, the dual-active bridge converter can include a DC-AC converter, an input end thereof being connected to a first direct current bus; an AC-DC converter, an output end thereof being connected to a second direct current bus; a transformer, a primary side thereof being connected to an output end of the DC-AC converter, and a secondary side thereof being connected to an input end of the AC-DC converter; and a control device. The control method can include: providing a first pulse width modulation signal to the DC-AC converter so as to cause an output voltage thereof to be zero at a starting time of each period of the first pulse width modulation signal and to have jump edges at particular times corresponding to particular odd-numbered current harmonics in the transformer, providing a second pulse width modulation signal to the AC-DC converter so as to cause the phase of an input voltage thereof to lag behind the phase of the output voltage of the DC-AC converter, and/or adjusting the first pulse width modulation signal and/or the second pulse width modulation signal so as to cause a current valley value of a positive half period of a current waveform of the transformer to be a negative value and a current valley value of a negative half period thereof to be a positive value.

The dual-active bridge converter of the present inventive concept has low power loss and is widely applicable.

BRIEF DESCRIPTION OF THE DRAWINGS

Embodiments of the present inventive concept are further described below with reference to the accompanying drawings.

DETAILED DESCRIPTION OF THE EMBODIMENTS

In order for the objectives, technical solutions, and advantages of the present inventive concept to be clearer, the present inventive concept is further described in detail below by means of specific embodiments with reference to the accompanying drawings. It should be understood that the specific embodiments described herein are only intended to explain the present inventive concept, rather than to limit the present inventive concept.

In actual applications, a high-frequency voltage applied to a high-frequency transformer causes relatively high loss in a magnetic core and winding thereof, and therefore the frequency of the high-frequency voltage can be limited, thereby limiting industrial application of the high-frequency transformer.

In terms of the winding loss, odd-numbered (e.g., third, fifth, seventh, . . . ) current harmonics introduced into the high-frequency transformer by a square-wave voltage generated by the DC-AC converter can result in relatively high loss. In some cases, one or more particular current harmonics in the high-frequency transformer must be eliminated to reduce power loss of the transformer.

Reference is made to the patent application having the application number 202110717580.6 filed by Eaton Intelligent Power Ltd. and entitled "Dual-Active Bridge Converter and Control Method Therefor," which is hereby incorporated herein by reference in its entirety. The solution provided by the patent application can be as follows: a pulse width modulation signal can be provided to a DC-AC converter so as to cause an output voltage thereof to be zero at a starting time of each period of the pulse width modulation signal and to have jump edges at particular times corresponding to particular odd-numbered current harmonics in a transformer. Such a converter can be referred to as a harmonic-elimination dual-active bridge converter.

However, in order to achieve jumps in the output voltage, a plurality of switching operations may be performed, and the switching operations can be implemented by using semiconductor switch devices including a fast-switching thyristor, a gate turn-off (GTO) thyristor, a power transistor (GTR), a power field-effect transistor (MOSFET), an insulated gate bipolar transistor (IGBT), and the like. However, semiconductor switch devices cause very high switching loss in switching procedures, thereby increasing power loss of a dual-active bridge converter, and thus limiting industrial application of the high-frequency transformer.

Figure 1:
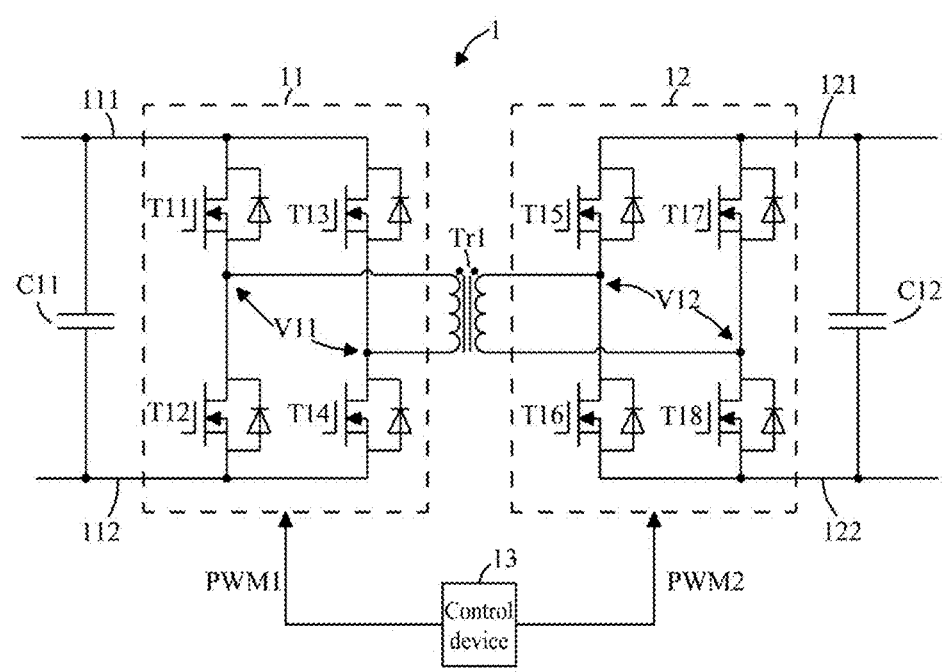
FIG. 1 is an example circuit diagram of a dual-active bridge converter in accordance with some embodiments of the present inventive concept.

FIG. 1 is a circuit diagram of a dual-active bridge converter in accordance with some embodiments of the present inventive concept. As shown in FIG. 1, a dual-active bridge converter 1 includes a DC-AC converter 11, an AC-DC converter 12, a transformer Tr1, and a control device 13. A positive electrode input terminal 111 and a negative electrode input terminal 112 of the DC-AC converter 11 are connected to a first positive direct current bus and a first negative direct current bus (i.e., two ends of a capacitor C11), respectively. An output end of the DC-AC converter 11 is connected to a primary side of the transformer Tr1. An input end of the AC-DC converter 12 is connected to a secondary side of the transformer Tr1, and a positive electrode output terminal 121 and a negative electrode output terminal 122 thereof are connected to a second positive direct current bus and a second negative direct current bus (i.e., two ends of a capacitor C12), respectively.

The control device 13 is used to provide a first pulse width modulation signal PWM1 to the DC-AC converter 11 so as to control the DC-AC converter 11 to convert a medium to high voltage direct current (e.g., 9600 volts) at the two ends of the capacitor C11 into an alternating current, i.e., an output voltage V11. The control device 13 is used to provide a second pulse width modulation signal PWM2 to the AC-DC converter 12 so as to control the AC-DC converter 12 to rectify an input voltage V12 of the input end thereof into a low-voltage direct current (e.g., about 800 volts).

The DC-AC converter 11 can be an H-bridge (full-bridge) converter, and includes switching transistors T11, T12, T13, and T14. The switching transistors T11 and T12 are connected in sequence to the two ends of the capacitor C11. The switching transistors T13 and T14 are connected in sequence to the two ends of the capacitor C11. A node formed by the switching transistors T11 and T13 being connected to each other acts as a first positive electrode input terminal. A node formed by the switching transistors T12 and T14 being connected to each other acts as a first negative electrode input terminal. A node formed by the switching transistors T11 and T12 being connected to each other and a node formed by the switching transistors T13 and T14 being connected to each other act as output ends of the DC-AC converter 11.

The AC-DC converter 12 can be an H-bridge (full-bridge) converter, and includes switching transistors T15, T16, T17, and T18. The switching transistors T15 and T16 are connected in sequence to the two ends of the capacitor C12. The switching transistors T17 and T18 are connected in sequence to the two ends of the capacitor C12. A node formed by the switching transistors T15 and T17 being connected to each other acts as a second positive electrode output terminal. A node formed by the switching transistors T16 and T18 being connected to each other acts as a second negative electrode output terminal. A node formed by the switching transistors T15 and T16 being connected to each other and a node formed by the switching transistors T17 and T18 being connected to each other act as input ends of the AC-DC converter 12.

The control device 13 controls the DC-AC converter 11 and the AC-DC converter 12 by using control methods that are substantially the same. The difference lies in that a phase difference is present between the first pulse width modulation signal PWM1 provided to the DC-AC converter 11 and the second pulse width modulation signal PWM2 provided to the AC-DC converter 12, so that a phase difference is present between the phase of the output voltage V11 and the phase of the input voltage V12 so as to generate a current in the transformer Tr1.

In order to eliminate even-numbered harmonics in the output voltage V11 of the DC-AC converter 11, the control device 13 controls the DC-AC converter 11 to cause a waveform of the output voltage V11 thereof to be axisymmetric from a starting time to a half period (i.e., a phase angle of 0 to $\pi$) of each period of the first pulse width modulation signal PWM1 and to be centrosymmetric in each period (i.e., a phase angle of 0 to $\pi$) of the first pulse width modulation signal PWM1.

In order to eliminate particular odd-numbered current harmonics in the transformer Tr1, the control device 13 is configured to provide the first pulse width modulation signal PWM1 to the DC-AC converter 11 so as to cause the output voltage V11 thereof to be zero at the starting time of each period of the first pulse width modulation signal PWM1 and to have jump edges at particular times corresponding to particular current harmonics in the transformer Tr1.

Refer to oscillograms of an output voltage of a DC-AC converter of the harmonic-elimination dual-active bridge converter shown in FIG. 2(a) to FIG. 2(d). After the output voltage V11 having jump edges at specific phase angles $\alpha_1$ to $\alpha_5$ is converted from the time domain to the frequency domain, the Fourier series thereof is simultaneously free of corresponding orders of harmonics, thereby simultaneously eliminating corresponding orders of current harmonics in the transformer Tr1. Refer to the spectrogram of a transformer current of a harmonic-elimination dual-active bridge converter shown in FIG. 3, wherein third, fifth, and seventh harmonics of relatively high intensity are eliminated.

Figure 2A:
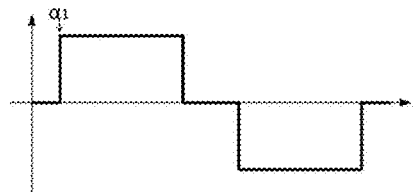
FIG. 2(a) to FIG. 2(d) are example oscillograms of an output voltage of a DC-AC converter of a harmonic-elimination dual-active bridge converter.
Figure 2B:
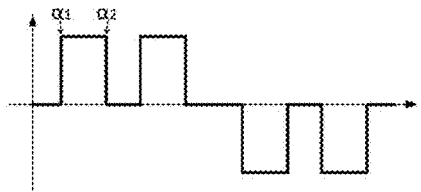
Figure 2C:
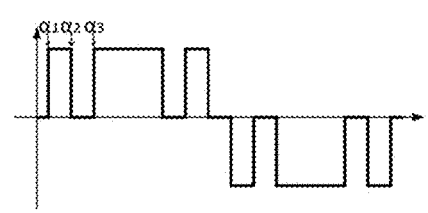
Figure 2D:
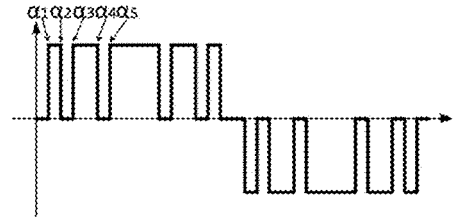
Figure 3:
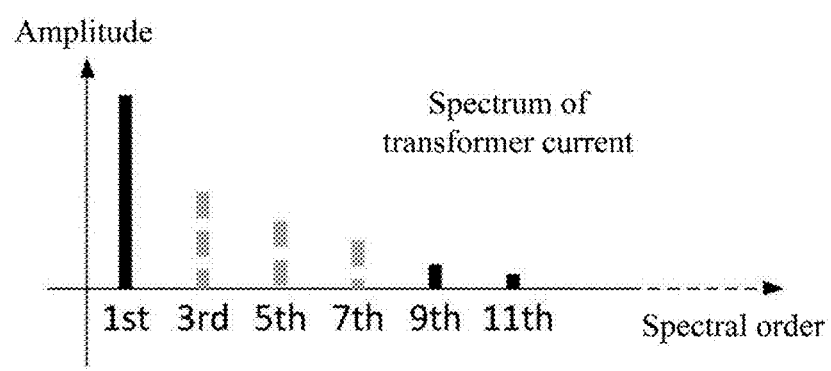
FIG. 3 shows a spectrogram of an example transformer current of an example harmonic-elimination dual-active bridge converter.

Switching loss is discussed by using an example in which the output voltage V1 of the DC-AC converter has three jump edges from a starting time to a ¼ period (i.e., a phase angle of 0 to $\pi/2$) of a pulse width modulation signal (as shown in FIG. 2(c)). The devices and methods of the present inventive concept are not limited to the foregoing.

Figure 4A:
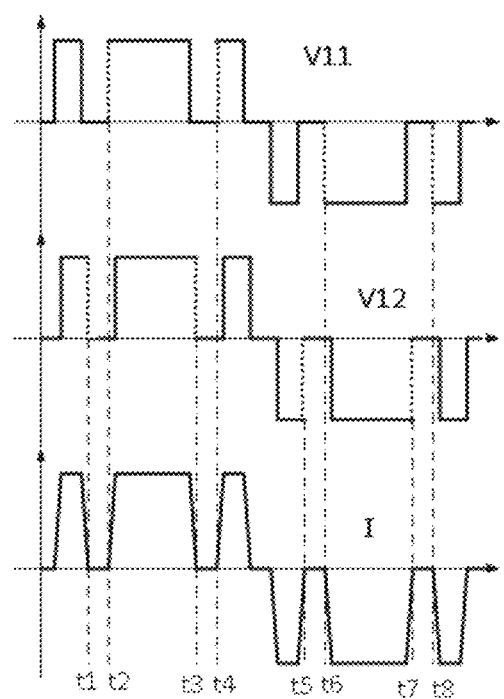
FIG. 4(a) to FIG. 4(c) show oscillograms of an output voltage V11 of a DC-AC converter, an input voltage V12 of an AC-DC converter, and a current I in a transformer in accordance with some embodiments of the present inventive concept.
Figure 4B:
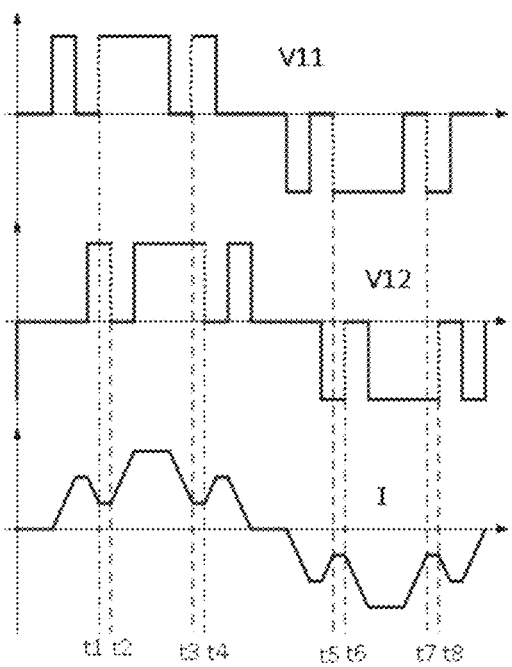
Figure 4C:
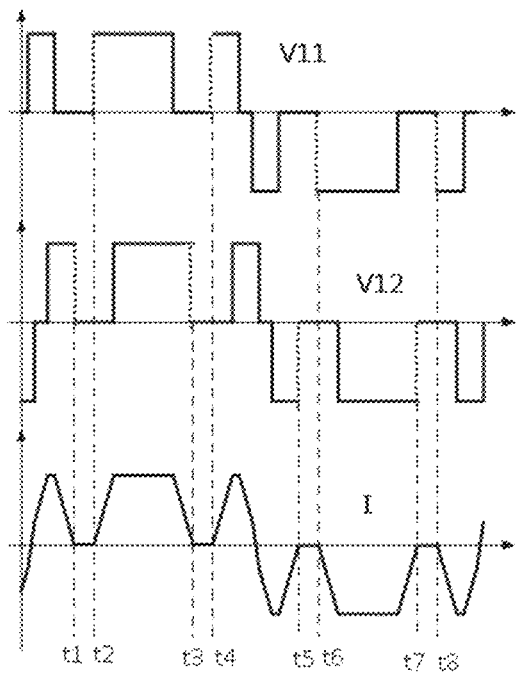

FIG. 4(a) to FIG. 4(c) show oscillograms of an output voltage V11 of a DC-AC converter, an input voltage V12 of an AC-DC converter, and a current I in a transformer in three different cases. In FIG. 4(a), the phase of the input voltage V12 lags behind the phase of the output voltage V11 by $\Psi$1. The interval between jump edges of V11 and V12 in FIG. 4(b) is substantially the same as that in FIG. 4(a). However, the first jump edge of V11 is farther from the time of zero, and the phase of the input voltage V12 lags behind the phase of the output voltage V11 by $\Psi2 > \Psi1$. The interval between jump edges of V11 and V12 in FIG. 4(c) is different from those in FIG. 4(a) and FIG. 4(b), and the phase of the input voltage V12 lags behind the phase of the output voltage V11 by $\Psi$3 which is greater than $\Psi$1 and less than $\Psi$2. In addition, the first jump edge of V11 is closer to the time of zero. In FIG. 4(a) to FIG. 4(c), the waveform of the current I being continuously zero in one period occurs, and is therefore referred to as a "discontinuous current mode (DCM)". Particularly, in FIG. 4(a) and FIG. 4(c), the current I returns to zero for a period of time after passing each voltage pulse. FIG. 4(a) is used as an example. In the first half period of the current I, the voltage V11 jumps from zero level to a high level at times t2 and t4, and in this case, the switching transistors T11 and T14 are turned on. The voltage V12 jumps from a high level to the zero level at times t1 and t3, and in this case the switching transistors T16 and T17 are turned on. Likewise, in the second half period of the current I, the voltage V11 jumps from the zero level to a low level at times t6 and t8, and in this case, the switching transistors T12 and T13 are turned on. The voltage V12 jumps from a low level to the zero level at times t5 and t7, and in this case the switching transistors T15 and T18 are turned on.

Figure 5:
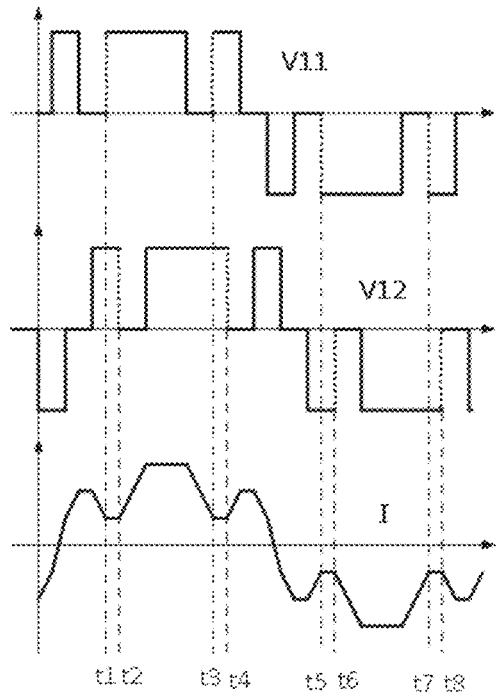
FIG. 5 shows an oscillogram of an output voltage V11 of a DC-AC converter, an input voltage V12 of an AC-DC converter, and a current I in a transformer in accordance with some embodiments of the present inventive concept.

Refer to the oscillogram of an output voltage V11 of a DC-AC converter, an input voltage V12 of an AC-DC converter, and a current I in a transformer in another case shown in FIG. 5. Waveforms of the voltages V11 and V12 are similar to those in FIG. 4(a), but the difference lies in that the phase of V12 lags further behind the phase of V11, so that the last pulse of a period of V12 overlaps with the first pulse of the next period of V11. In the first half period of the waveform of the current I, the voltage V11 jumps from the zero level to a high level at times t1 and t3, and in this case, the switching transistors T11 and T14 are turned on. The voltage V12 jumps from a high level to the zero level at times t2 and t4, and in this case the switching transistors T16 and T17 are turned on. Likewise, in the second half period of the current I, the voltage V11 jumps from the zero level to a low level at times t5 and t7, and in this case, the switching transistors T12 and T13 are turned on. The voltage V12 jumps from a low level to the zero level at times t6 and t8, and in this case the switching transistors T15 and T18 are turned on. In FIG. 5, except a zero crossing point (i.e., a transition point between positive and negative half periods), the current I being continuously zero in neither the positive half period nor the negative half period occurs, and is therefore referred to as a "continuous current mode (CCM)".

Switching procedures of switch devices are typically divided into soft switching and hard switching. The soft switching is relative to the hard switching. The hard switching results in large switching loss, a large inductive turn-off voltage spike, a large capacitive turn-on current spike, and severe electromagnetic interference. Therefore, in order to reduce or even eliminate the switching loss, the inventor considers changing all switching procedures of a converter into soft switching.

In the present inventive concept, as in the case of FIG. 4(a) to FIG. 4(c) and FIG. 5, for the output voltage V11 of the DC-AC converter, when the current I corresponding to the rising edge thereof (jumping from the zero level to the high level or jumping from the low level to the zero level) is negative or the current I corresponding to the falling edge (jumping from the zero level to the low level or jumping from the high level to the zero level) is positive, the corresponding switching procedure is soft switching, and reversely, when the current I corresponding to the rising edge thereof is positive or the current I corresponding to the falling edge is negative, the corresponding switching procedure is hard switching. For the input voltage V12 of the AC-DC converter, when the current I corresponding to the rising edge thereof is positive or the current I corresponding to the falling edge is negative, the corresponding switching procedure is soft switching, and reversely, when the current I corresponding to the rising edge thereof is negative or the current I corresponding to the falling edge is positive, the corresponding switching procedure is hard switching. As can be clearly seen from 4(a) to 4(c) and FIG. 5, switching procedures corresponding to times t1 to t8 are all hard switching, which necessarily results in very large switching loss.

Figure 6:
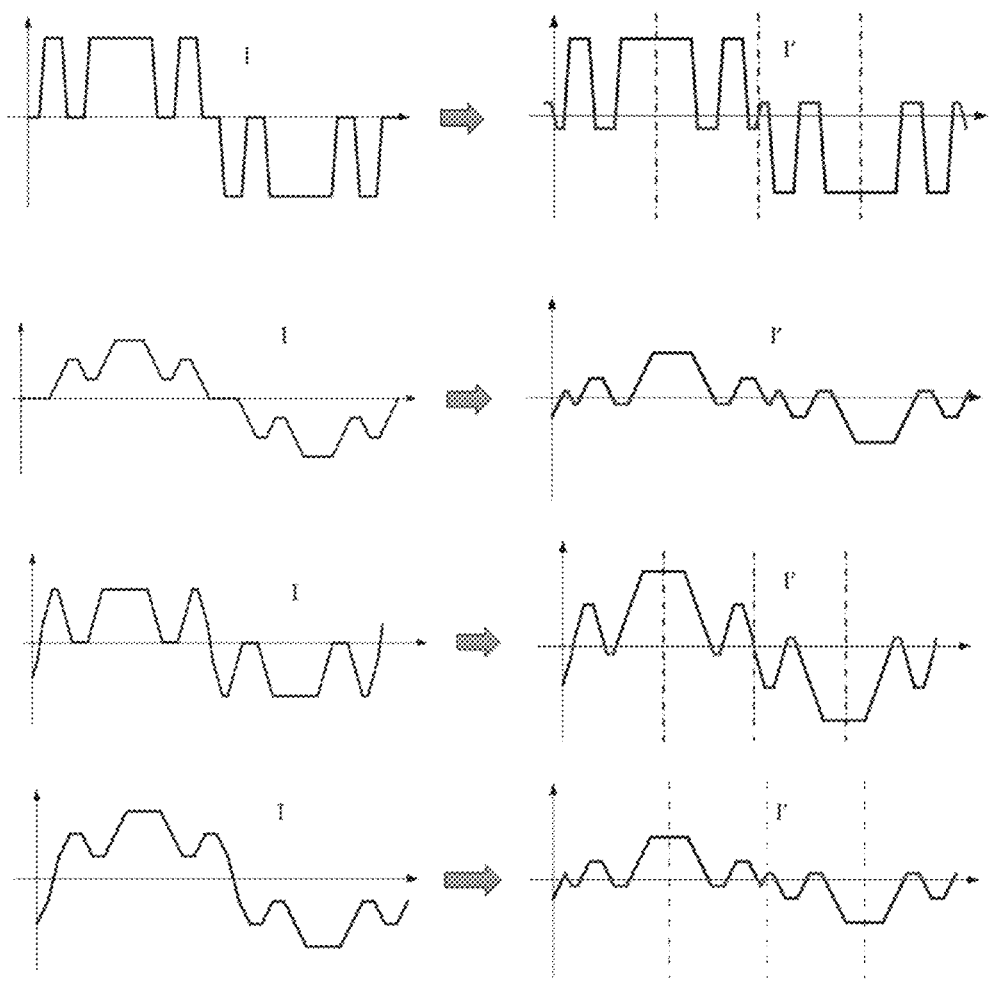
FIG. 6 shows changes in a transformer current waveform I in accordance with some embodiments of the present inventive concept.

In the present inventive concept, the waveform of the transformer current I is adjusted to change the correspondence between a voltage jump edge and the current I, thereby achieving the change from a hard switching procedure to a soft switching procedure. FIG. 6 shows changes in transformer current waveform I. If the current waveforms I (respectively corresponding to the current waveforms shown in FIG. 4(a) to FIG. 4(c) and FIG. 5) on the left side are converted to the current waveforms I' on the right side, then a positive current originally corresponding to a rising edge of the voltage V11 can be changed into a negative current, and a negative current corresponding to a falling edge thereof can be changed into a positive current. Meanwhile, a positive current originally corresponding to a falling edge of the voltage V12 can be changed into a negative current, and a negative current corresponding to a rising edge thereof can be changed into a positive current. In this way, an initial hard switching procedure can be changed into a soft switching procedure, thereby greatly reducing, or even eliminating, switching loss. For example, for the discontinuous current waveforms shown in FIG. 4(a) and FIG. 4(c), the current zero point of the positive half period is pulled down into a negative value, and the current zero point of the negative half period is pulled up into a positive value. For the discontinuous current waveform shown in FIG. 4(b), the current valley value of the positive half period is pulled down into a negative value, and the current peak value of the negative half period is pulled up into a positive value. As can be seen, in the waveform in FIG. 4(b), the current valley values of the positive half period include a zero valley value and a positive valley value, and the current peak values of the negative half period include a zero peak value and a negative peak value. The current zero point shown in FIG. 4(a) and FIG. 4(c) is in fact a special valley/peak value. The continuous current waveform shown in FIG. 5 is first changed into the discontinuous current waveform shown in FIG. 4(b). Then, the current valley value of the positive half period is pulled down into a negative value, and the current peak value of the negative half period is pulled up into a positive value. The magnitude of pull-down or pull-up can be 1% to 10% of the original pulse amplitude, and, in some cases, can be 1% to 5% of the original pulse amplitude.

In embodiments of the present inventive concept, the pulse waveforms of the output voltage V11 of the DC-AC converter and/or the input voltage V12 of the AC-DC converter are controlled to adjust the transformer current waveform, thereby changing the above current waveform. Pulse waveform control methods provided in the following specific embodiments are merely illustrative, and are not limiting.

Embodiment 1

Figure 7:
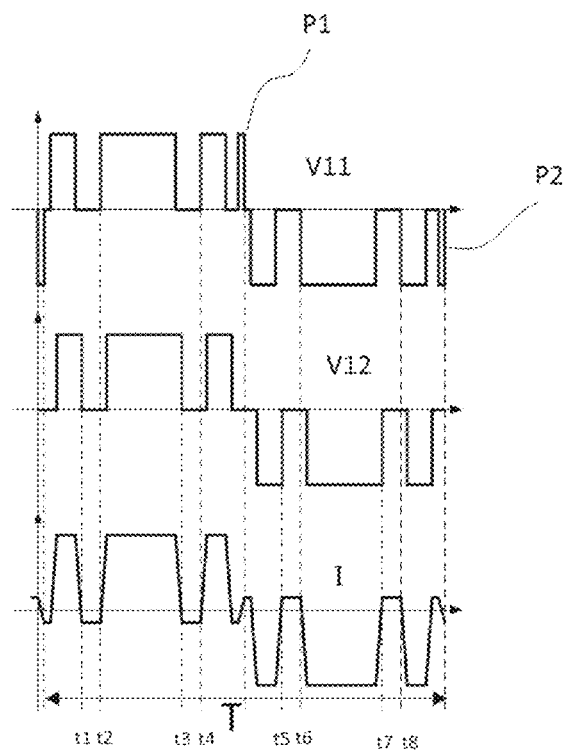
FIG. 7 shows an oscillogram of an output voltage V11 of a DC-AC converter, an input voltage V12 of an AC-DC converter, and a current I in a transformer in accordance with some embodiments of the present inventive concept.

Provided in this embodiment is a method for controlling pulse waveforms of an output voltage V11 of a DC-AC converter and/or an input voltage V12 of an AC-DC converter to adjust a transformer current waveform, which is referred to as a "pulse insertion method". This embodiment is for the case of the current waveform shown in FIG. 4(a). Refer to the oscillogram of an output voltage V11 of a DC-AC converter, an input voltage V12 of an AC-DC converter, and a current I in a transformer according to Embodiment 1 shown in FIG. 7. In a period T of the oscillogram of the output voltage V11, on the basis that three jump edges are provided in each ¼ period, a positive narrow pulse P1 and a negative narrow pulse P2, can narrow pulses of the level of µs, are respectively inserted in a positive half period and a negative half period. The narrow pulses P1 and P2 are respectively provided at the tail end of the positive half period and the tail end of the negative half period. That is, a fast switching procedure is added in a transition between positive and negative pulses of the output voltage V11. As understood from another angle, if a starting point of a period is moved to the origin, the solution of this embodiment is to insert a negative narrow pulse to a starting point of a positive half period and to insert a positive narrow pulse to a starting point of a negative half period. In order to achieve pulse insertion, it is required that the starting point of each half period of the original pulse waveform is zero and lasts a certain time, thereby allowing insertion of a narrow pulse. Referring to the oscillogram of the current I shown in FIG. 7, compared with the current oscillogram shown in FIG. 4(a), it can be seen that due to the insertion of the narrow pulses P1 and P2, the zero current point of the positive half period in the current waveform is pulled down into a negative current, and the zero current of the negative half period is pulled up into a positive current. As such, at times t2 and t4, the current I corresponding to the rising edge of the voltage V11 is negative. At times t6 and t8, the current I corresponding to the falling edge of the voltage V11 is positive. At times t1 and t3, the current corresponding to the falling edge of the voltage V12 is negative. At times t5 and t7, the current corresponding to the rising edge of the voltage V12 is positive. In addition, currents corresponding to rising edges of short pulses P1 and P2 newly inserted to the voltage V11 are negative, and currents corresponding to falling edges thereof are positive. It can be seen that inserting a short pulse into the voltage V11 can adjust the transformer current as shown in FIG. 6, and eventually, hard switching in the switching procedure is changed into soft switching, thereby changing over to soft switching, and reducing switching loss.

Figure 8:
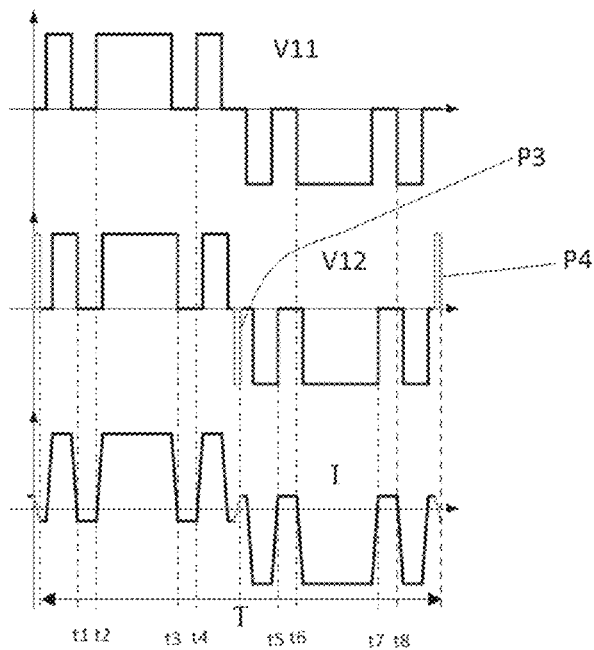
FIG. 8 shows another oscillogram of an output voltage V11 of a DC-AC converter, an input voltage V12 of an AC-DC converter, and a current I in a transformer in accordance with some embodiments of the present inventive concept.

Similarly, the same objective can also be achieved by adjusting the pulse waveform of the input voltage V12. As shown in FIG. 8, FIG. 8 shows another oscillogram of an output voltage V11 of a DC-AC converter, an input voltage V12 of an AC-DC converter, and a current I in a transformer according to Embodiment 1. In a period T of the oscillogram of the input voltage V12, on the basis that three jump edges are provided in each ¼ period, a negative narrow pulse P3 and a positive narrow pulse P4, can narrow pulses of the level of µs, are respectively inserted in a positive half period and a negative half period. The narrow pulses P3 and P4 are respectively provided at the tail end of the positive half period and the end of the negative half period. That is, a fast switching procedure is added in a transition between positive and negative pulses of the output voltage V11. Likewise, as understood from another angle, if a starting point of a period is moved to the origin, the solution of this embodiment is to insert a positive narrow pulse to a starting point of a positive half period of V12 and to insert a negative narrow pulse to a starting point of a negative half period. By means of such configurations, an oscillogram similar to that in FIG. 7 can also be acquired. Likewise, at times t2 and t4, the current I corresponding to the rising edge of the voltage V11 is negative. At times t6 and t8, the current I corresponding to the falling edge of the voltage V11 is positive. At times t1 and t3, the current corresponding to the falling edge of the voltage V12 is negative. At times t5 and t7, the current corresponding to the rising edge of the voltage V12 is positive. In addition, currents corresponding to rising edges of short pulses P3 and P4 newly inserted to the voltage V12 are positive, and currents corresponding to falling edges thereof are negative. It can be seen that inserting a short pulse into the voltage V12 changes hard switching in the switching procedure into soft switching, thereby changing over to soft switching, and reducing switching loss.

Figure 9:
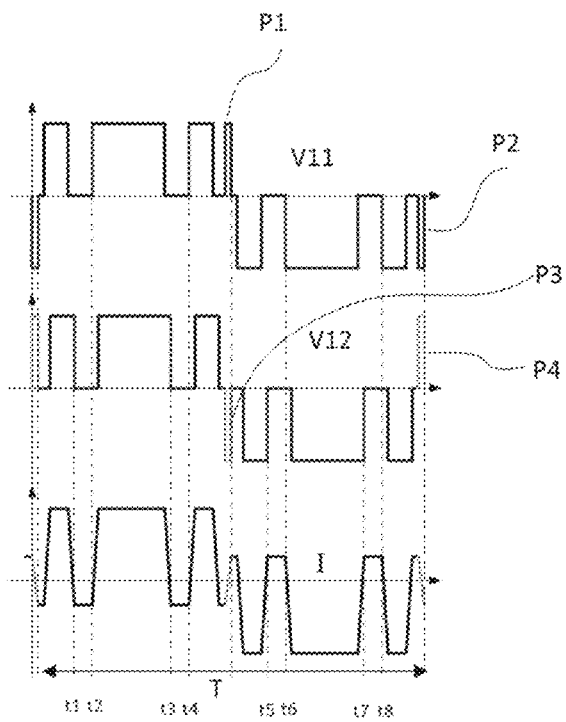
FIG. 9 shows still another oscillogram of an output voltage V11 of a DC-AC converter, an input voltage V12 of an AC-DC converter, and a current I in a transformer in accordance with some embodiments of the present inventive concept.

The objective of the present inventive concept can be achieved by adjusting the pulse waveforms of both the voltage V11 and the voltage V12. As shown in FIG. 9, FIG. 9 shows still another oscillogram of an output voltage V11 of a DC-AC converter, an input voltage V12 of an AC-DC converter, and a current I in a transformer according to Embodiment 1. In a period T of the oscillogram of the output voltage V11, on the basis that three jump edges are provided in each ¼ period, a positive narrow pulse P1 and a negative narrow pulse P2 are respectively inserted in the tail end of a positive half period and the end of a negative half period. Meanwhile, in a period T of the oscillogram of the input voltage V12, on the basis that three jump edges are provided in each ¼ period, a negative narrow pulse P3 and a positive narrow pulse P4 are respectively inserted in the tail end of a positive half period and the end of a negative half period. As such, the zero current point of the positive half period in the waveform of the current I is pulled down into a negative current, and the zero current in the negative half period is pulled up into a positive current, thereby also changing all switching procedures in an entire period into soft switching. Additionally, in this case, the magnitude of pull-up/pull-up of the zero current point is the superposition of those in the foregoing two cases. Therefore, configuring the widths of the inserted pulses P1 to P4 to be less than the widths of the inserted pulses in the foregoing two cases can also achieve the same objective.

In this embodiment, the original current in the position of a pulse insertion point is zero, and a corresponding current can be generated by inserting a short voltage pulse, thereby achieving the effect of controlling the current direction, and achieving a required current waveform. The pulse insertion method is applicable to the cases shown in FIG. 4(a) and FIG. 4(b) in which a sufficient region for pulse insertion is available.

Embodiment 2

Provided in this embodiment is another method for controlling pulse waveforms of an output voltage V11 of a DC-AC converter and/or an input voltage V12 of an AC-DC converter to adjust a transformer current waveform, which is referred to as a "pulse cutting/adding method". Regarding the pulse oscillogram shown in FIG. 4(c), for the voltages V11 and V12, the interval between the last pulse of the positive half period and the first pulse of the negative half period is relatively small, and likewise, the interval between the last pulse of the negative half period and the first pulse of a next positive half period is also relatively small, so that at the start of each half fundamental period, a primary side pulse overlaps with a secondary side pulse of a preceding period, and the current in this position is not zero. Therefore, the pulse insertion method in Embodiment 1 is no longer applicable. Certainly, the pulse insertion method is still applicable in regions in which pulses do not overlap, but this is not the focus of this embodiment.

Figure 10:
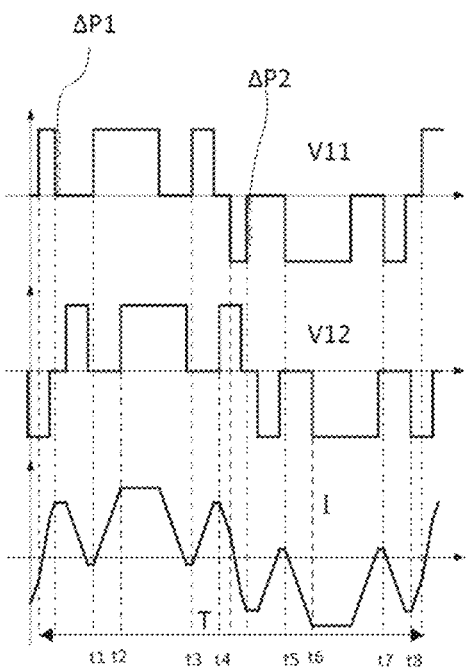
FIG. 10 shows an oscillogram of an output voltage V11 of a DC-AC converter, an input voltage V12 of an AC-DC converter, and a current I in a transformer in accordance with some embodiments of the present inventive concept.

Refer to the oscillogram of an output voltage V11 of a DC-AC converter, an input voltage V12 of an AC-DC converter, and a current I in a transformer according to Embodiment 2 shown in FIG. 10. In a period T of the oscillogram of the output voltage V11, on the basis that three jump edges are provided in each ¼ period, portions ΔP1 and ΔP2 are respectively cut off rear ends of the first pulse of a positive half period and the first pulse of a negative half period. Referring to the oscillogram of the current I shown in FIG. 10, compared with the current oscillogram shown in FIG. 4(c), it can be seen that since portions of the pulse are cut off, the zero current point of the positive half period in the current waveform is pulled down into a negative current, and the zero current of the negative half period is pulled up into a positive current. As such, at times t1 and t3, the current I corresponding to the rising edge of the voltage V11 is negative. At times t5 and t7, the current I corresponding to the falling edge of the voltage V11 is positive. At times t2 and t4, the current corresponding to the rising edge of the voltage V12 is positive. At times t6 and t8, the current corresponding to the falling edge of the voltage V12 is negative. It can be seen that cutting the pulse changes hard switching in the switching procedure into soft switching, thereby changing over to soft switching, and reducing switching loss.

Figure 11:
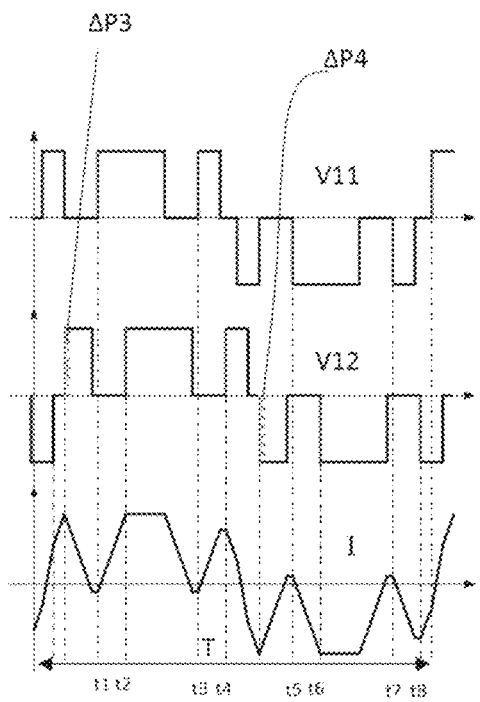
FIG. 11 shows another oscillogram of an output voltage V11 of a DC-AC converter, an input voltage V12 of an AC-DC converter, and a current I in a transformer in accordance with some embodiments of the present inventive concept.

Similarly, the same objective can also be achieved by adjusting the pulse waveform of the input voltage V12. Refer to another oscillogram of an output voltage V11 of a DC-AC converter, an input voltage V12 of an AC-DC converter, and a current I in a transformer according to Embodiment 2 shown in FIG. 11. In a period T of the oscillogram of the output voltage V12, on the basis that three jump edges are provided in each ¼ period, portions ΔP3 and ΔP4 are respectively added to front ends of the first pulse of a positive half period and the first pulse of a negative half period. As such, the current oscillogram similar to that in FIG. 10 can also be acquired, and hard switching in the switching procedure is changed into soft switching, thereby changing over to soft switching, and reducing switching loss.

In addition, cutting of the voltage V11 and addition to the voltage V12 can both be performed, i.e., a combination of the foregoing two methods. As such, the magnitude of cutting or addition may be smaller than that in the foregoing two methods.

A transformer current is the result of joint action of a primary side bridge output voltage and a secondary side bridge output voltage. If the primary side pulse is cut but the original pulse on the secondary side remains unchanged, then a negative current can be generated. Similarly, if the original pulse on the primary side remains unchanged but addition to the secondary side pulse is performed, then a negative current can also be generated.

Pulse cutting is to reduce the voltage pulse width in a certain direction of the primary side so as to reduce an increase in the current in this direction, which is equivalent to generating a reverse current in the half current period so as to adjust the current waveform.

Pulse addition is to increase the voltage pulse width in a certain direction of the secondary side so as to increase an increase in the current in the reverse direction, which is equivalent to generating a reverse current in the half current period so as to adjust the current waveform.

The pulse width of the cut or added pulse depends on the required reverse current, but cannot be so large as to introduce too many additional harmonics.

Embodiment 3

Figure 12:
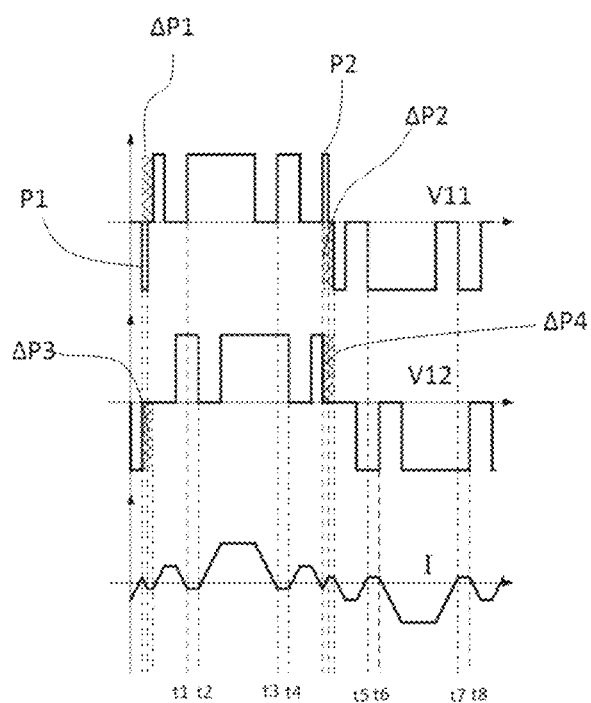
FIG. 12 shows an oscillogram of an output voltage V11 of a DC-AC converter, an input voltage V12 of an AC-DC converter, and a current I in a transformer in accordance with some embodiments of the present inventive concept.

Provided in this embodiment is a method for controlling pulse waveforms of an output voltage V11 of a DC-AC converter and/or an input voltage V12 of an AC-DC converter. This embodiment is for the case of the current waveform shown in FIG. 5. Refer to the oscillogram of an output voltage V11 of a DC-AC converter, an input voltage V12 of an AC-DC converter, and a current I in a transformer according to Embodiment 3 shown in FIG. 12. In a period T of the oscillogram of the output voltage V11, on the basis that three jump edges are provided in each ¼ period, overlapping portions ΔP1 and ΔP3 between the first positive pulse of V11 and the last negative pulse of a preceding period of V12 are cut off, and then a negative pulse P1 is inserted before the first positive pulse of V11. Likewise, overlapping portions ΔP2 and ΔP4 between the first negative pulse of V11 and the last positive pulse of V12 are cut off, and a positive pulse P2 is inserted before the first negative pulse of V11. In this embodiment, cutting a portion off a pulse and then inserting a reverse pulse is equivalent to reversing a portion of the original pulse, so that this method is named a "pulse reversing method". Referring to the oscillogram of the current I shown in FIG. 12, compared with the current oscillogram shown in FIG. 5, it can be seen that due to pulse reversing, the zero current point of the positive half period in the current waveform is pulled down into a negative current, and the zero current of the negative half period is pulled up into a positive current. As such, at times t1 and t3, the current I corresponding to the rising edge of the voltage V11 is negative. At times t5 and t7, the current I corresponding to the falling edge of the voltage V11 is positive. At times t2 and t4, the current corresponding to the falling edge of the voltage V12 is negative. At times t6 and t8, the current corresponding to the rising edge of the voltage V12 is positive. It can be seen that pulse reversing changes hard switching in the switching procedure into soft switching, thereby changing soft switching, and reducing switching loss.

Figure 13:
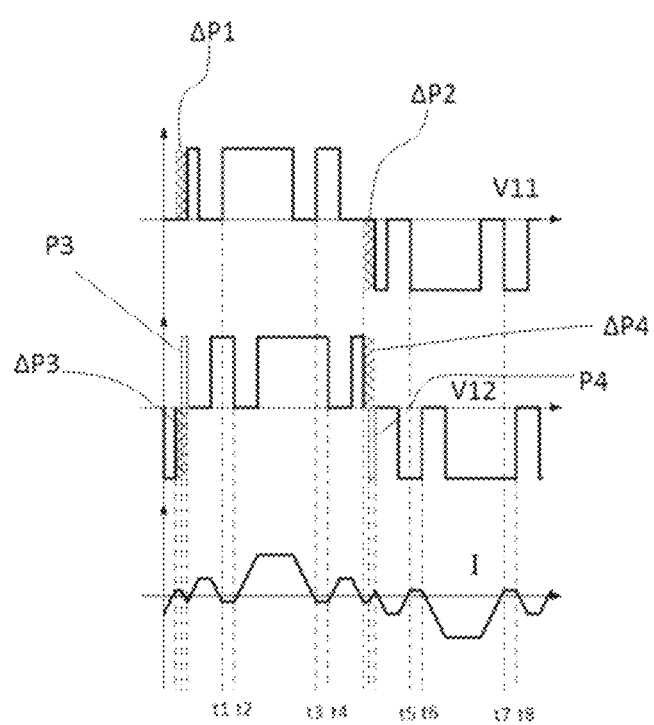
FIG. 13 shows another oscillogram of an output voltage V11 of a DC-AC converter, an input voltage V12 of an AC-DC converter, and a current I in a transformer in accordance with some embodiments of the present inventive concept.

Similarly, referring to FIG. 13, the same current waveform is acquired by inserting a reverse pulse into V12.

The essence of this embodiment is to first convert the current waveform shown in FIG. 5 to the current waveform shown in FIG. 4(b) by adjusting an original pulse width or a phase shift angle of an original secondary side pulse, and then perform pulse insertion. Therefore, pulse reversing is essentially the same as the pulse insertion method of Embodiment 1, that is, to adjust the current waveform by using a reverse voltage pulse to generate a reverse current. The difference lies in that no voltage pulse is present in the original position in the insertion method, but a voltage pulse is originally present in an insertion point in the reversing method, and so insertion in this position is manifested as voltage pulse cutting and reversing. The pulse reversing is equivalent to using both the pulse cutting method and the pulse insertion method, and is applicable generally to the CCM mode.

In general, in the present inventive concept, the hard switching procedure is changed into the soft switching procedure by adjusting the current waveform of the transformer. In the foregoing embodiments of the present inventive concept, in the half period, adjusting the pulse in only one position can cause the current in all positions to change. As the time length of the falling edge of the current and the length of the rising edge are the same, so once the current in a certain point is pulled to be negative, the current thereafter also decreases to the same value as the start, which is equivalent to that the current in the half period is translated as a whole. Therefore, performing pulse insertion, cutting, addition, and reversing operations in any appropriate position according to the methods in the foregoing embodiments can achieve the objective of the present inventive concept. It is not necessary to perform the operation on the first pulse as shown in the foregoing embodiments. Performing the operation on the first pulse is preferred, and is applicable to any pulse waveform including when the positive half period and the negative half period each have only one pulse.

To verify the effect of the present inventive concept, the inventor performed a simulation on the PLECS® platform by selecting an operating fundamental frequency of 30 kHz and a three-pulse operating mode.

Figure 14A:
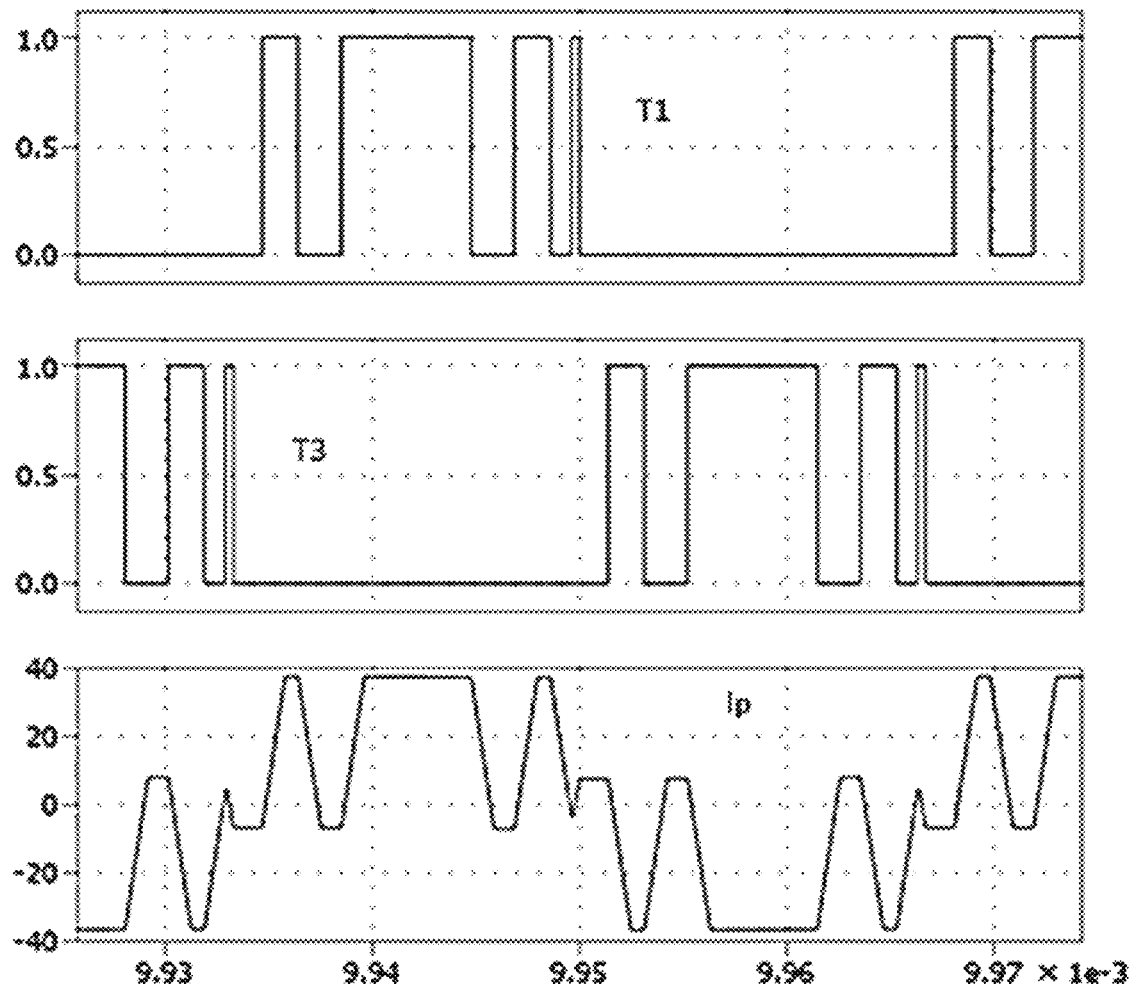
FIG. 14(a) and FIG. 14(b) show example simulation results corresponding to the method shown in FIG. 7.
Figure 14B:
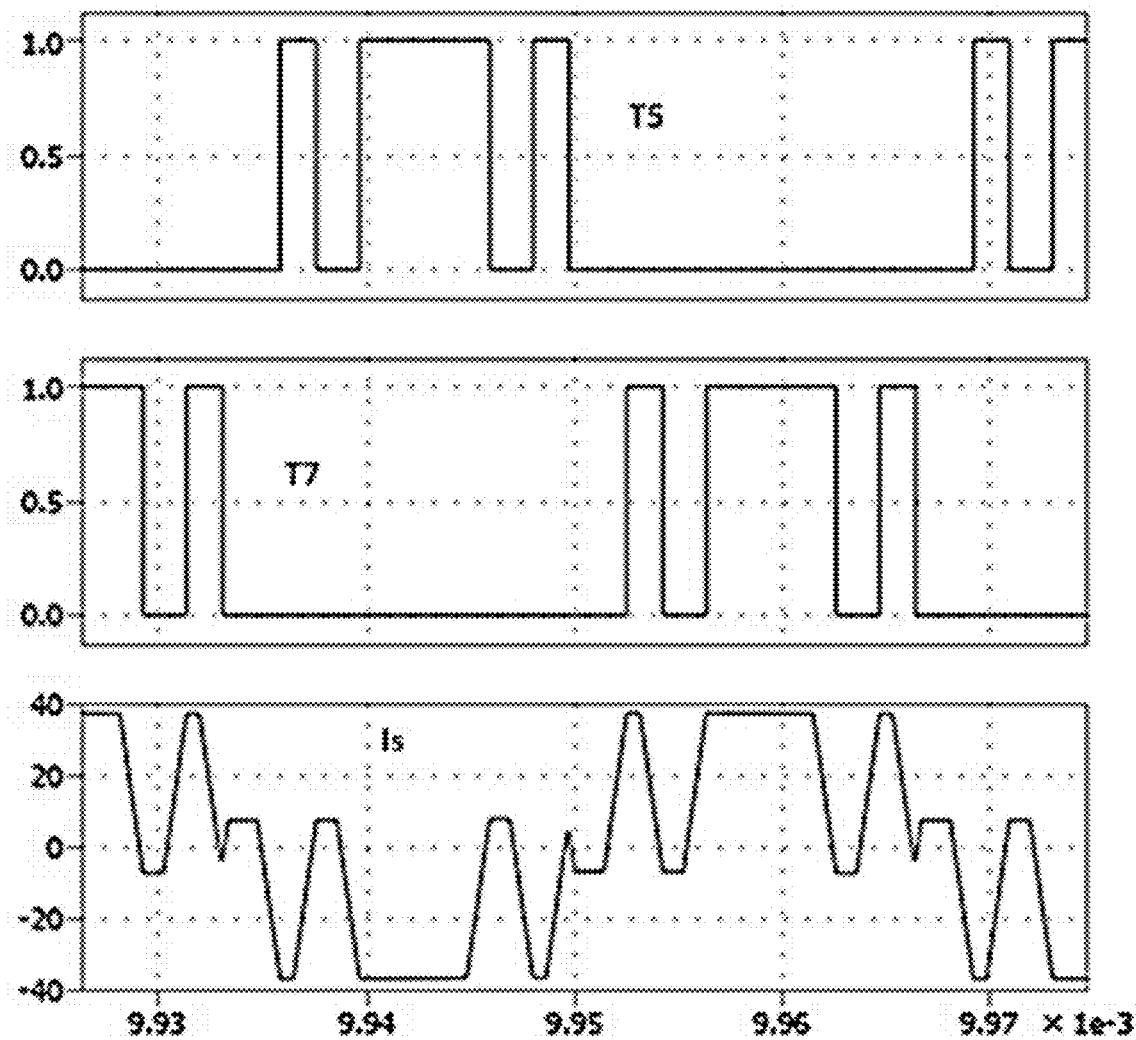
Figure 15A:
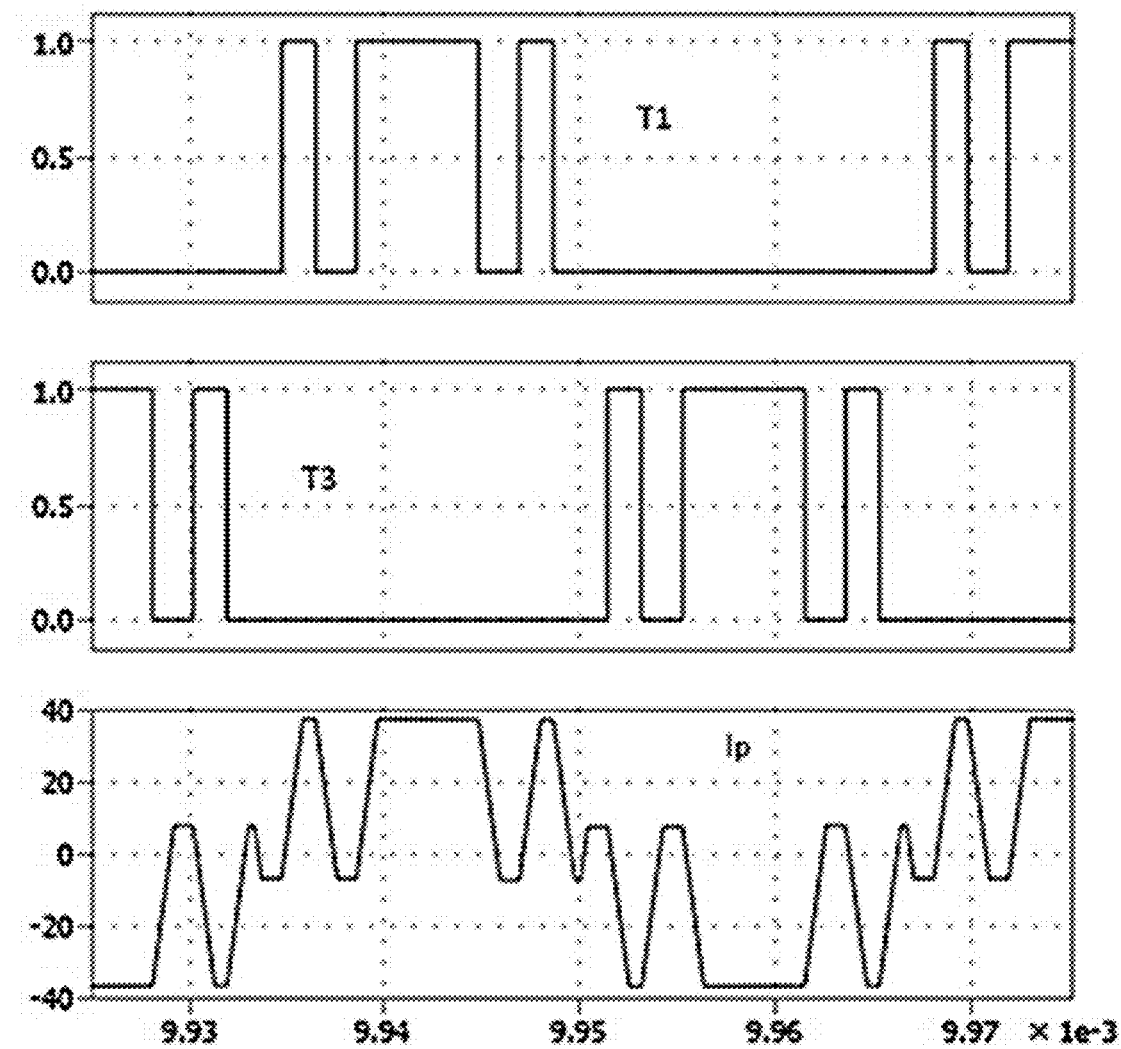
FIG. 15(a) and FIG. 15(b) show example simulation results corresponding to the method in FIG. 8.
Figure 15B:
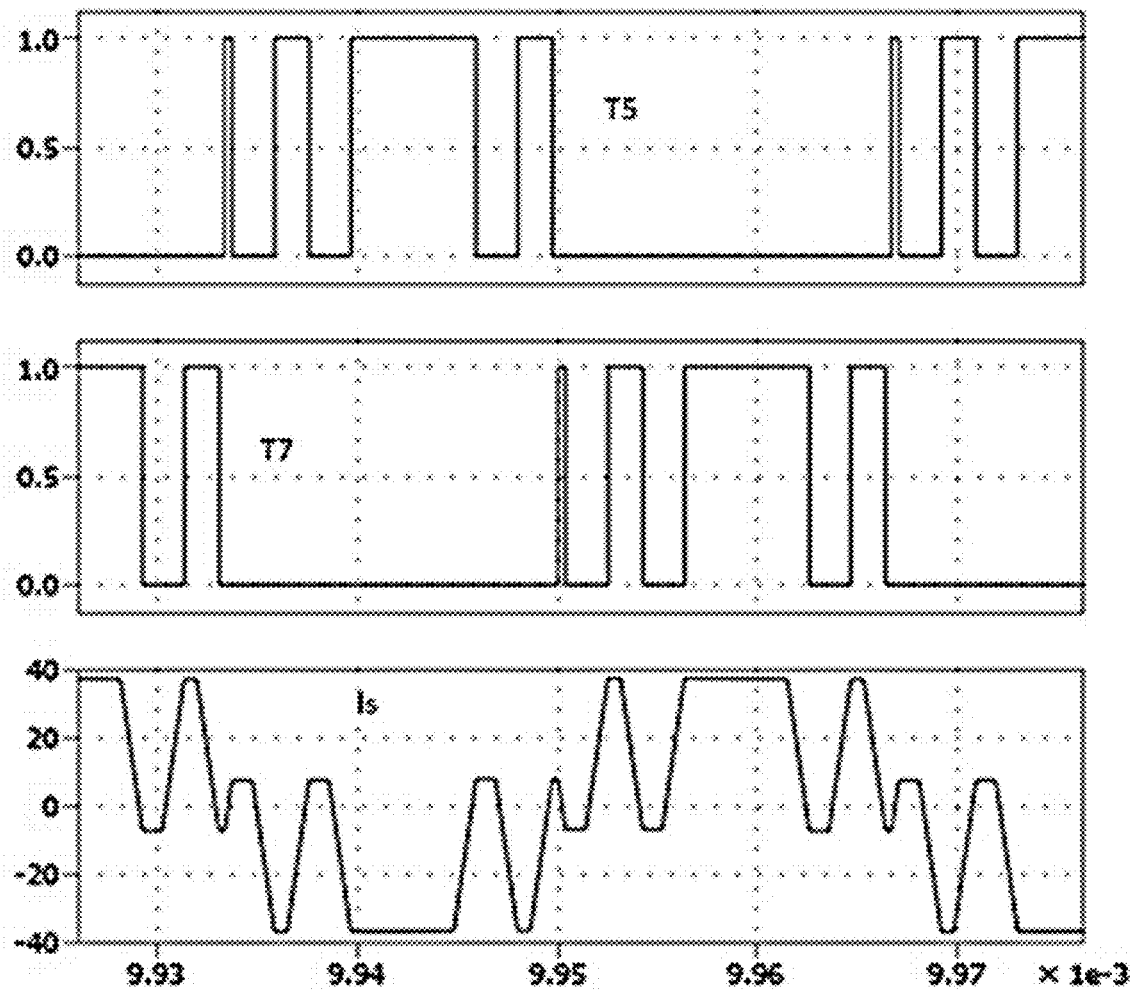
Figure 16A:
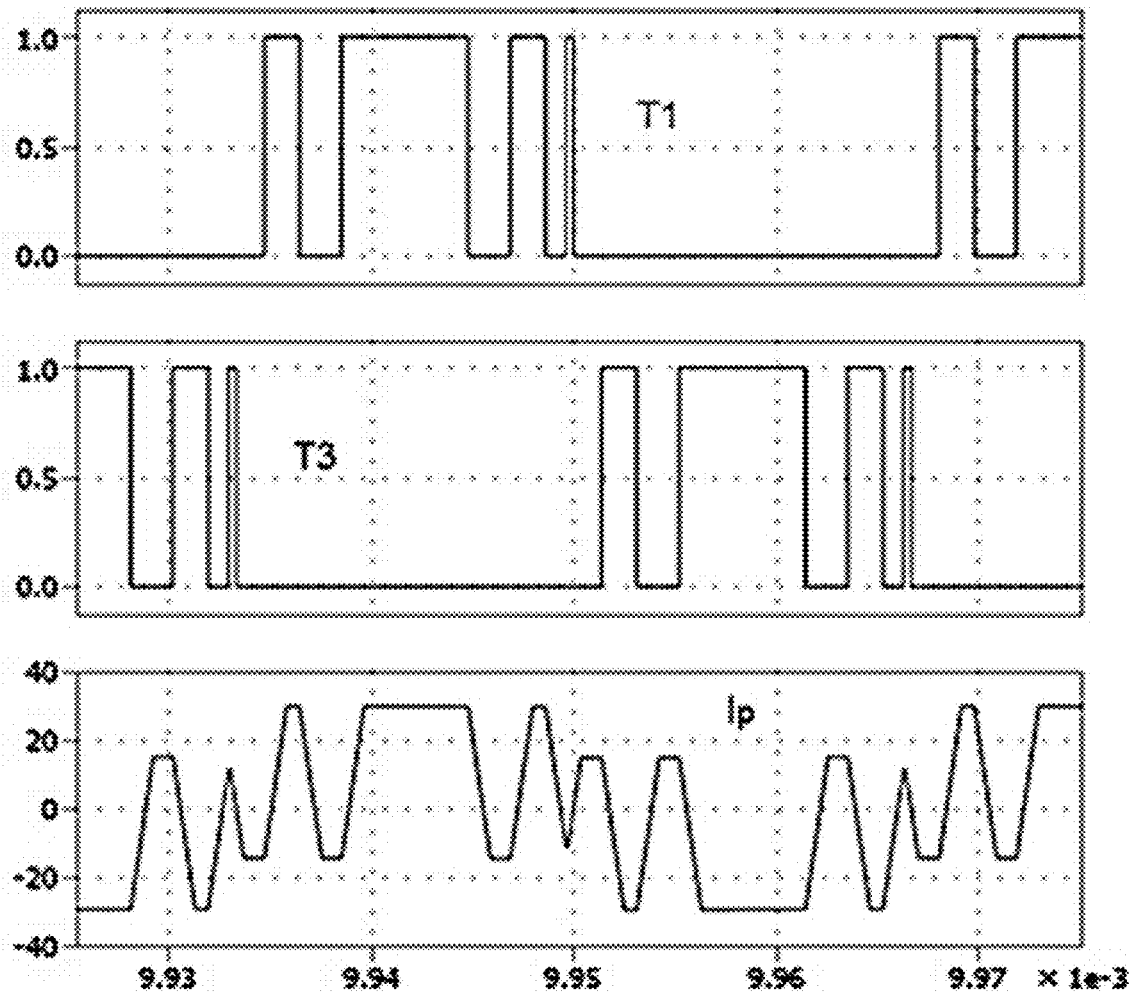
FIG. 16(a) and FIG. 16(b) show example simulation results corresponding to the method in FIG. 9.
Figure 16B:
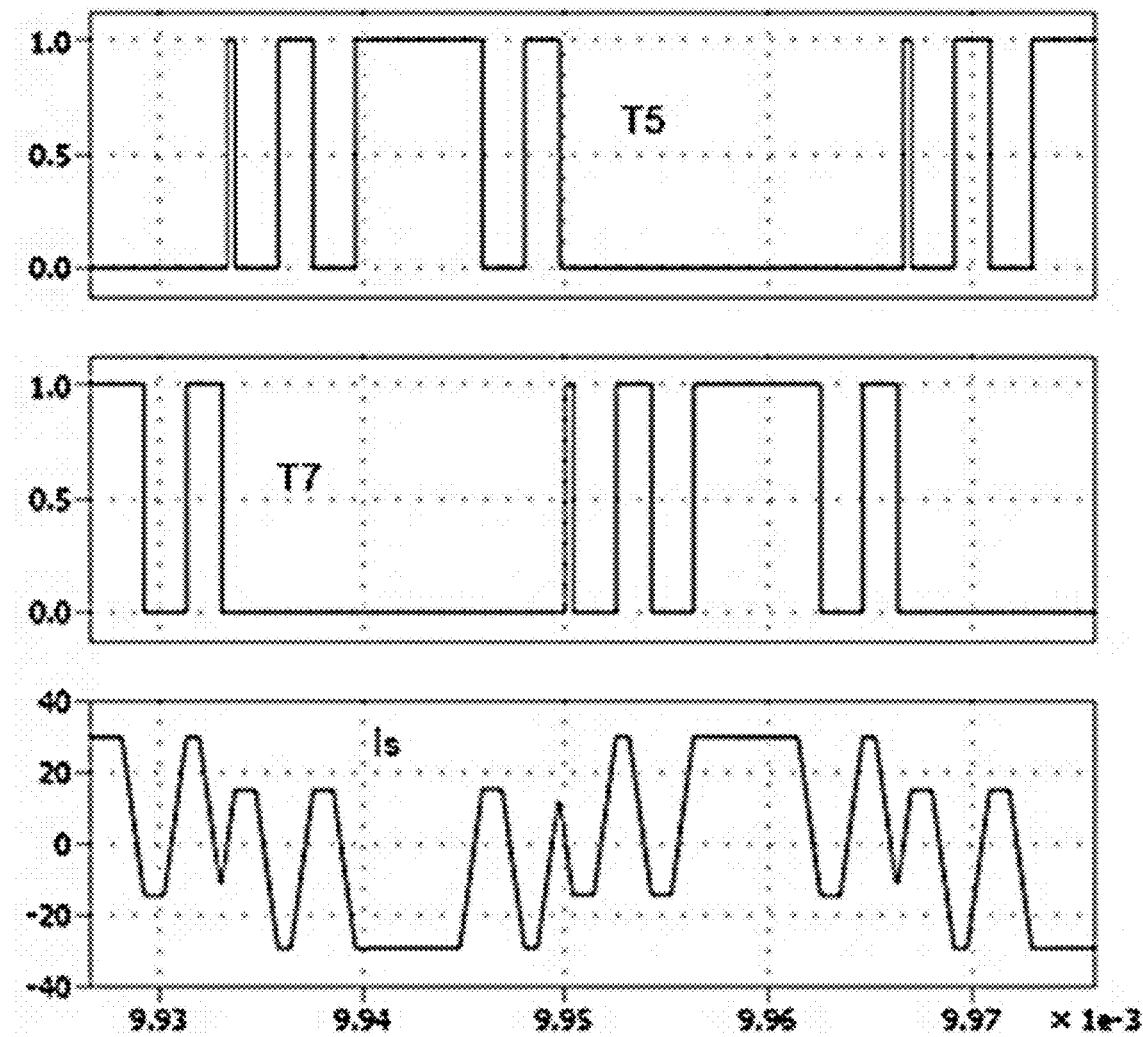

FIG. 14(a) and FIG. 14(b), FIG. 15(a) and FIG. 15(b), and FIG. 16(a) and FIG. 16(b) are simulation results of the pulse insertion method. FIG. 14(a) and FIG. 14(b) correspond to the method shown in FIG. 7. FIG. 15(a) and FIG. 15(b) correspond to the method shown in FIG. 8. FIG. 16(a) and FIG. 16(b) correspond to the method shown in FIG. 9. Ip represents the primary side current of the transformer, and Is represents the secondary side current of the transformer.

Figure 17:
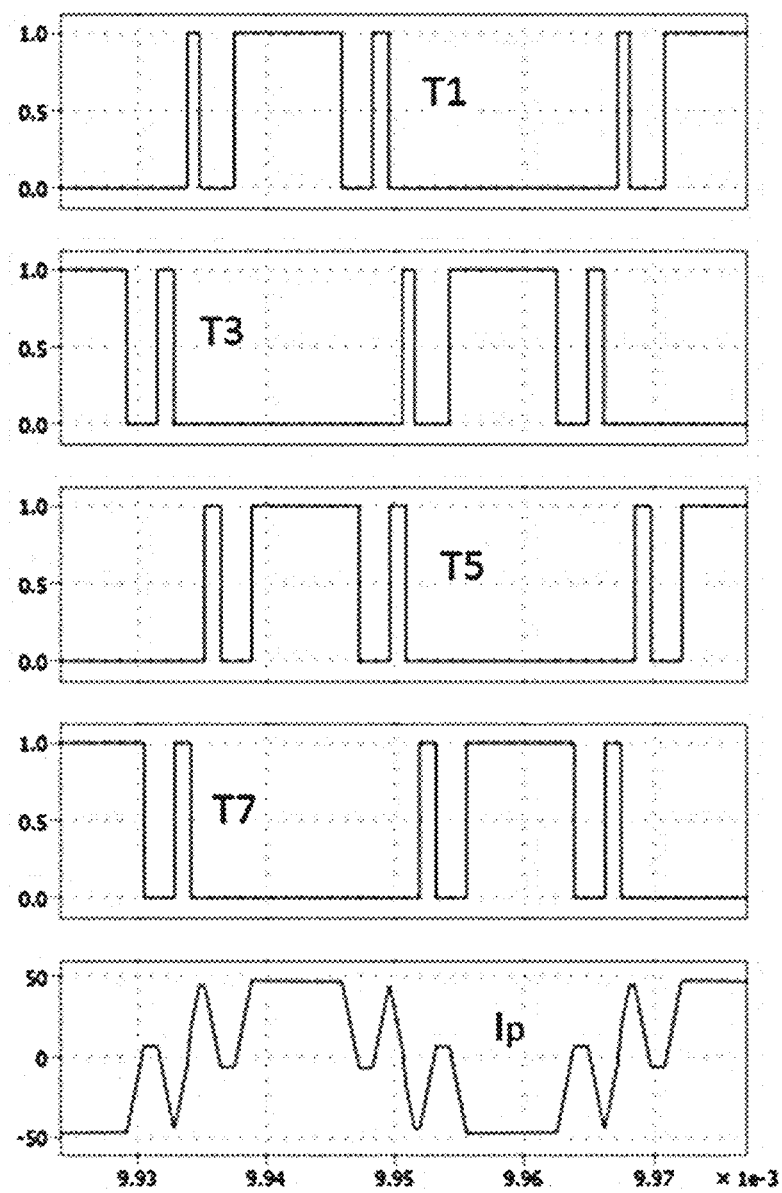
FIG. 17 shows example simulation results corresponding to the method in FIG. 10.

FIG. 17 is a simulation result of the pulse cutting method, and corresponds to the method shown in FIG. 10.

Figure 18:
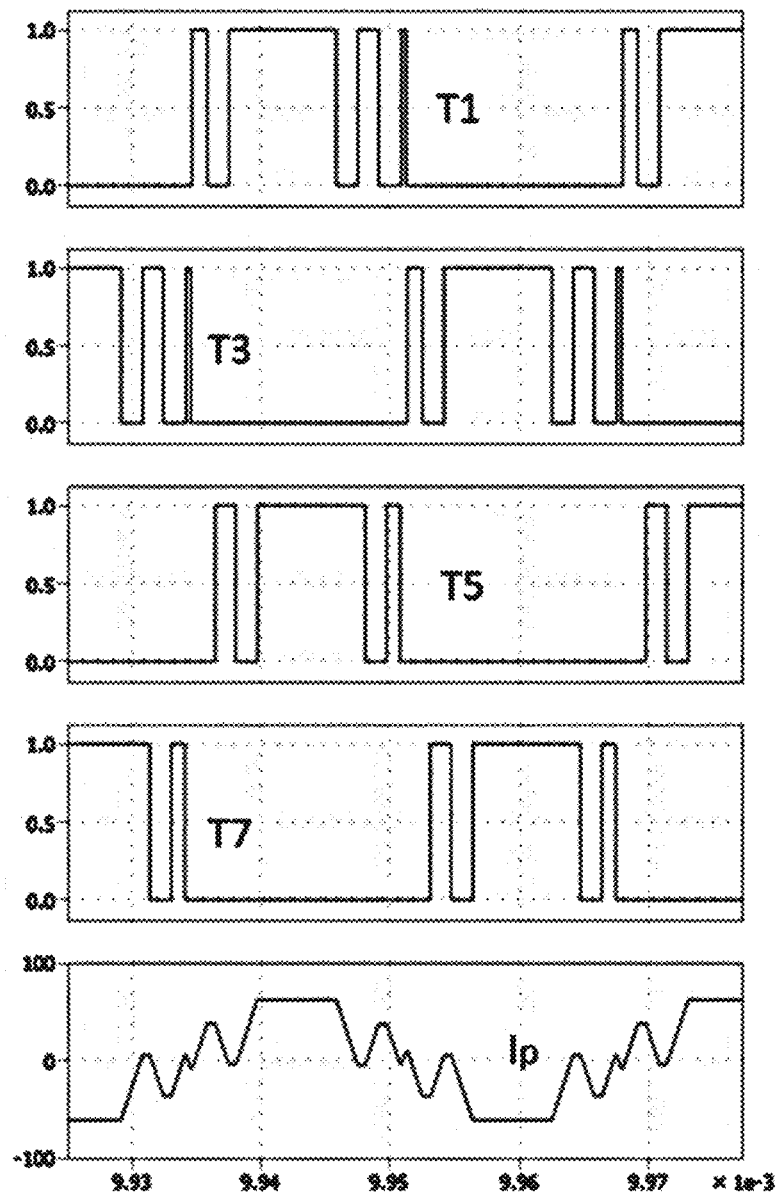
FIG. 18 shows example simulation results corresponding to the method in FIG. 12.

FIG. 18 is a simulation result of the pulse reversing method, and corresponds to the method shown in FIG. 12.

It can be clearly seen from the simulation results that the method of the present inventive concept achieves soft switching control of all switching procedures, thereby greatly reducing switching loss, and improving working efficiency of the dual-active bridge converter.

In other embodiments of the present inventive concept, the DC-AC converter may also be a half-bridge DC-AC converter or a multi-level DC-AC converter, and the AC-DC converter may also be a half-bridge AC-DC converter or a multi-level AC-DC converter. In the present inventive concept, the DC-AC converter and the AC-DC converter can be two identical bidirectional DC-AC converters, so that the dual-active bridge converter can achieve bidirectional transmission of electrical energy. In other embodiments, the DC-AC converter and the AC-DC converter may also have different topologies.

The control device of the present inventive concept can eliminate one or more particular current harmonics in the transformer, which are not limited to the above third, fifth, seventh, and/or ninth current harmonics, and the like. On this basis, the control device of the present inventive concept implements complete soft switching operations, thereby greatly reducing switching loss.

Figure 19:
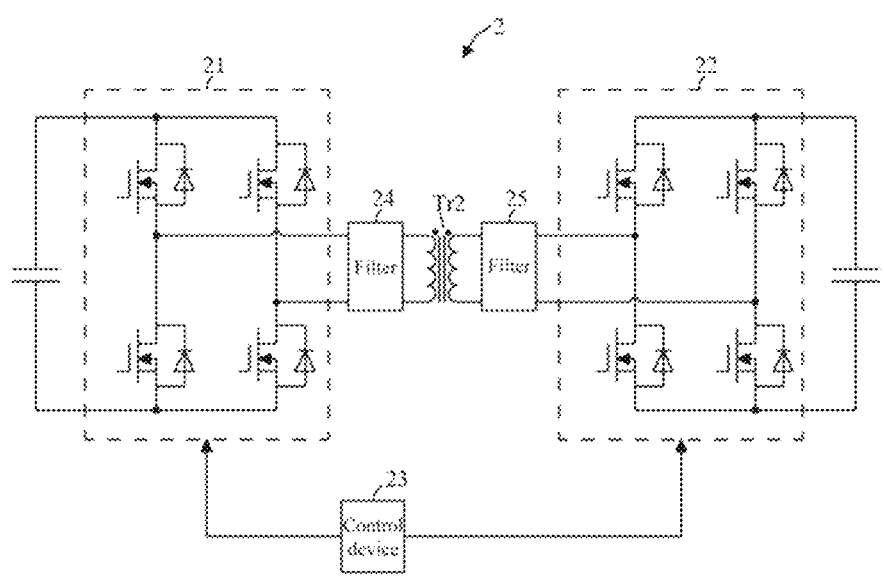
FIG. 19 is a circuit diagram of an example dual-active bridge converter in accordance with some embodiments of the present inventive concept.

According to another embodiment of the present inventive concept, referring to the circuit diagram of a dual-active bridge converter shown in FIG. 19, the dual-active bridge converter 2 is substantially the same as the circuit diagram 1 of the dual-active bridge converter 1 shown in FIG. 1, and the difference lies in that the dual-active bridge converter 2 further includes a filter 24 and a filter 25. The filter 24 is connected between an output end of a DC-AC converter 21 and a primary side of a transformer Tr2. The filter 25 is connected between a secondary side of the transformer Tr2 and an input end of an AC-DC converter 22. The filters 24 and 25 can be low-pass filters. The filter 24 is used to filter out high-order harmonics in an output voltage of the DC-AC converter 21 which are not eliminated by the control device 23, so as to prevent the high-order harmonics from flowing to the primary side of the transformer Tr2. The filter 25 is used to further filter out high-order harmonics in the secondary side of the transformer Tr2.

Although the present inventive concept has been described through preferred embodiments, the present inventive concept is not limited to the embodiments described herein, but includes various changes and variations made without departing from the scope of the present inventive concept.

The invention claimed is:

1. A dual-active bridge converter, comprising:
a transformer comprising a primary side and a secondary side;
a DC-AC converter comprising an input end coupled to a first direct current (DC) bus, and an output end coupled to the primary side of the transformer;
an AC-DC converter comprising an input end coupled to the secondary side of the transformer, and an output end coupled to a second DC bus; and
a control device, configured to:
provide a first pulse width modulation (PWM) signal to the DC-AC converter so as to cause an output voltage thereof to be zero at a starting time of each period of the first PWM signal and to have jump edges at particular times corresponding to particular odd-numbered current harmonics in the transformer;
provide a second PWM signal to the AC-DC converter so as to cause a phase of an input voltage thereof to lag behind a phase of the output voltage of the DC-AC converter; and
adjust the first PWM signal and/or the second PWM signal so as to cause a current valley value of a positive half period of a current waveform of the transformer to be a negative value and a current valley value of a negative half period thereof to be a positive value.

2. The converter of claim 1, wherein a size of at least one of the negative value or the positive value is 1% to 10% of an amplitude of the current waveform.

3. The converter of claim 1, wherein the control device manipulates an output waveform of the DC-AC converter to be axisymmetric for half a period and centrosymmetric for a full period.

4. The converter of claim 3, wherein the input voltage of the AC-DC converter and the output voltage of the DC-AC converter are a plurality of rectangular pulses or a plurality of step pulses.

5. The converter of claim 1, wherein the control device controls the DC-AC converter to cause a voltage waveform of the output voltage thereof to be axisymmetric from the starting time to a half period of each period of the first PWM signal and to be centrosymmetric in each period of the PWM signal.

6. The converter of claim 5, wherein if the first pulse within each half period of the output voltage of the DC-AC converter does not overlap with any pulses of the input voltage of the AC-DC converter, the control device is configured to:
adjust the first PWM signal so as to add a first negative pulse before the first pulse of a positive half period of the output voltage of the DC-AC converter and to add a first positive pulse before the first pulse of a negative half period thereof, and/or
adjust the second PWM signal so as to add a second positive pulse before the first pulse of a positive half period of the input voltage of the AC-DC converter and to add a second negative pulse before the first pulse of a negative half period thereof,
wherein pulse widths of the first positive pulse, the second positive pulse, the first negative pulse, and the second negative pulse are less than a distance from the first pulse of the positive half period of the output voltage of the DC-AC converter to a zero point.

7. The converter of claim 5, wherein if the first pulse within each half period of the output voltage of the DC-AC converter overlaps with a pulse of the input voltage of the AC-DC converter, the control device is configured to:
   adjust the first PWM signal so as to reduce the width of the first pulse of a positive half period of the output voltage of the DC-AC converter and the width of the first pulse of a negative half period thereof; and/or
   adjust the second PWM signal so as to increase the width of the first pulse of a positive half period of the input voltage of the AC-DC converter and the width of the first pulse of a negative half period thereof.

8. The converter of claim 5, wherein if the first pulse within each half period of the output voltage of the DC-AC converter overlaps with a pulse of the input voltage of the AC-DC converter, the control device is configured to:
   adjust the first PWM signal and the second PWM signal so as to cut off an overlapping portion between the first pulse within each half period of the output voltage of the DC-AC converter and the last pulse of a preceding half period of the input voltage of the AC-DC converter, and
   adjust the first PWM signal so as to add a first negative pulse before the first pulse of a positive half period of the output voltage of the DC-AC converter and to add a first positive pulse before the first pulse of a negative half period thereof, and/or
   adjust the second PWM signal so as to add a second positive pulse before the first pulse of a positive half period of the input voltage of the AC-DC converter and to add a second negative pulse before the first pulse of a negative half period thereof,
   wherein pulse widths of the first positive pulse, the second positive pulse, the first negative pulse, and the second negative pulse are less than a distance from the first pulse of the positive half period of the output voltage of the DC-AC converter to a zero point after the overlapping portion is cut off.

9. The converter of claim 1, wherein the jump edge is a rising edge and/or a falling edge.

10. The converter of claim 1, wherein the control device controls the AC-DC converter to cause the input voltage thereof and the output voltage of the DC-AC converter to have the same voltage waveform.

11. A method comprising:
   providing a first pulse width modulation (PWM) signal to a DC-AC converter, the DC-AC converter having an input end in communication with a first direct current (DC) bus, wherein a first input voltage from the first DC bus is converted to a first output voltage that is transmitted to a primary side of a transformer, the first output voltage being configured to initiate at zero at a start of each period of the first PWM signal and include jump edges at instances corresponding to odd-numbered current harmonics in the transformer; and
   providing a second PWM signal to an AC-DC converter, the AC-DC converter having an input end in communication with a secondary side of the transformer and an output end in communication with a second DC bus, wherein a second input voltage received from the secondary side of the transformer is converted to a second output voltage directed to the second DC bus, the second input voltage being configured to have a phase that trails a phase of the first output voltage of the DC-AC converter.

12. The method of claim 11, further comprising adjusting at least one of the first PWM signal or the second PWM signal, such that a valley value of a current waveform traversing the transformer is a negative value during a positive half period and is a positive value during a negative half period.

13. The method of claim 12, wherein a width of each of the first and second positive pulses, and the first and second negative pulses, is less than a temporal interval between the first pulse of the positive half period of the output voltage waveform of the DC-AC converter and a zero point.

14. The method of claim 11, further comprising at least two of:
   introducing a first negative pulse prior to a first pulse of a positive half period of an output voltage waveform originating from the DC-AC converter;
   introducing a first positive pulse prior to a first pulse of a negative half period of the output voltage waveform;
   introducing a second positive pulse prior to a first pulse of a positive half period of an input voltage waveform received by the AC-DC converter; or
   introducing a second negative pulse prior to a first pulse of a negative half period of the input voltage waveform.

15. A dual-active bridge converter, comprising:
   a transformer comprising a primary side and a secondary side;
   a DC-AC converter comprising an input end coupled to a first direct current (DC) bus, and an output end coupled to the primary side of the transformer;
   an AC-DC converter comprising an input end coupled to the secondary side of the transformer, and an output end coupled to a second DC bus; and
   a control device configured to provide a first pulse width modulation (PWM) signal to the DC-AC converter and a second PWM signal to the AC-DC converter, wherein the control device controls a waveform of an output voltage from the DC-AC converter to be axisymmetric within a time interval extending from a starting point to a half period of each period of the first pulse width modulation signal, and to be centrosymmetric within each period of the first pulse width modulation signal.

16. The converter of claim 15, wherein a phase difference is maintained between the first PWM signal and the second PWM signal to generate a current in the transformer.

17. The converter of claim 15, wherein the control device configures the first PWM signal to cause the output voltage of the DC-AC converter to be zero at a starting time of each period.

18. The converter of claim 15, wherein the control device configures the first PWM signal to exhibit jump edges at times corresponding to at least some odd-numbered current harmonics in the transformer.

19. The converter of claim 15, wherein the control device configures the DC-AC converter to initiate an output voltage at zero at a starting time of each period of the first PWM signal.

20. The converter of claim 15, wherein the control device is configured to modulate the first and/or second pulse width modulation signals such that a valley value for a positive half period of a current waveform traversing the transformer registers as a negative value, and a valley value for a negative half period registers as a positive value.

* * * * *